United States Patent [19]

Andres et al.

[11] 3,784,810

[45] Jan. 8, 1974

[54] PNEUMATICALLY OPERATING CONTROL INSTALLATION FOR THE AUTOMATIC ALIGNMENT OF MOTOR VEHICLE HEADLIGHTS

[75] Inventors: Rudolf Andres, Sindelfingen; Hermann Möller, Aidlingen; Franz Seyfried, Sindelfingen, all of Germany

[73] Assignee: Daimler-Benz AG, Stuttgart, Germany

[22] Filed: Nov. 5, 1971

[21] Appl. No.: 195,984

[30] Foreign Application Priority Data
Nov. 6, 1970   Germany.................. P 20 54 644.5

[52] U.S. Cl. ........... 240/7.1 LJ, 240/62.1, 240/62.3
[51] Int. Cl. .............................................. B60g 1/06
[58] Field of Search .................... 240/7.11 LJ, 62.2, 240/62.3, 62.4; 91/47, 461

[56] References Cited
UNITED STATES PATENTS
3,243,958   4/1966   Ruchser............................ 91/46 X

| | | | |
|---|---|---|---|
| 2,575,085 | 11/1951 | Alyea | 91/47 X |
| 3,618,723 | 11/1971 | McPherson | 91/461 X |
| 3,516,182 | 6/1970 | Wykert | 91/47 X |
| 3,710,688 | 1/1973 | Bauer | 91/461 X |
| 3,551,668 | 12/1970 | Rivolier | 240/7.1 LJ |
| 3,596,837 | 8/1971 | Todd | 240/7.1 LJ |

FOREIGN PATENTS OR APPLICATIONS
1,013,907   8/1957   Germany .............................. 91/47

*Primary Examiner*—Samuel S. Matthews
*Assistant Examiner*—Michael D. Harris
*Attorney*—Craig, Antonelli & Hill

[57] ABSTRACT

A pneumatically operating control installation for the automatic alignment of motor vehicle headlights, in which the control members coordinated to one or two axles of the motor vehicle which align the headlights to a constant light range as a function of changes of the distance of the respective axle to the superstructure of the motor vehicle by way of adjusting motors and a control device, are constructed as pressure modulators while a vacuum, available at all times, is fed to the control installation.

20 Claims, 3 Drawing Figures

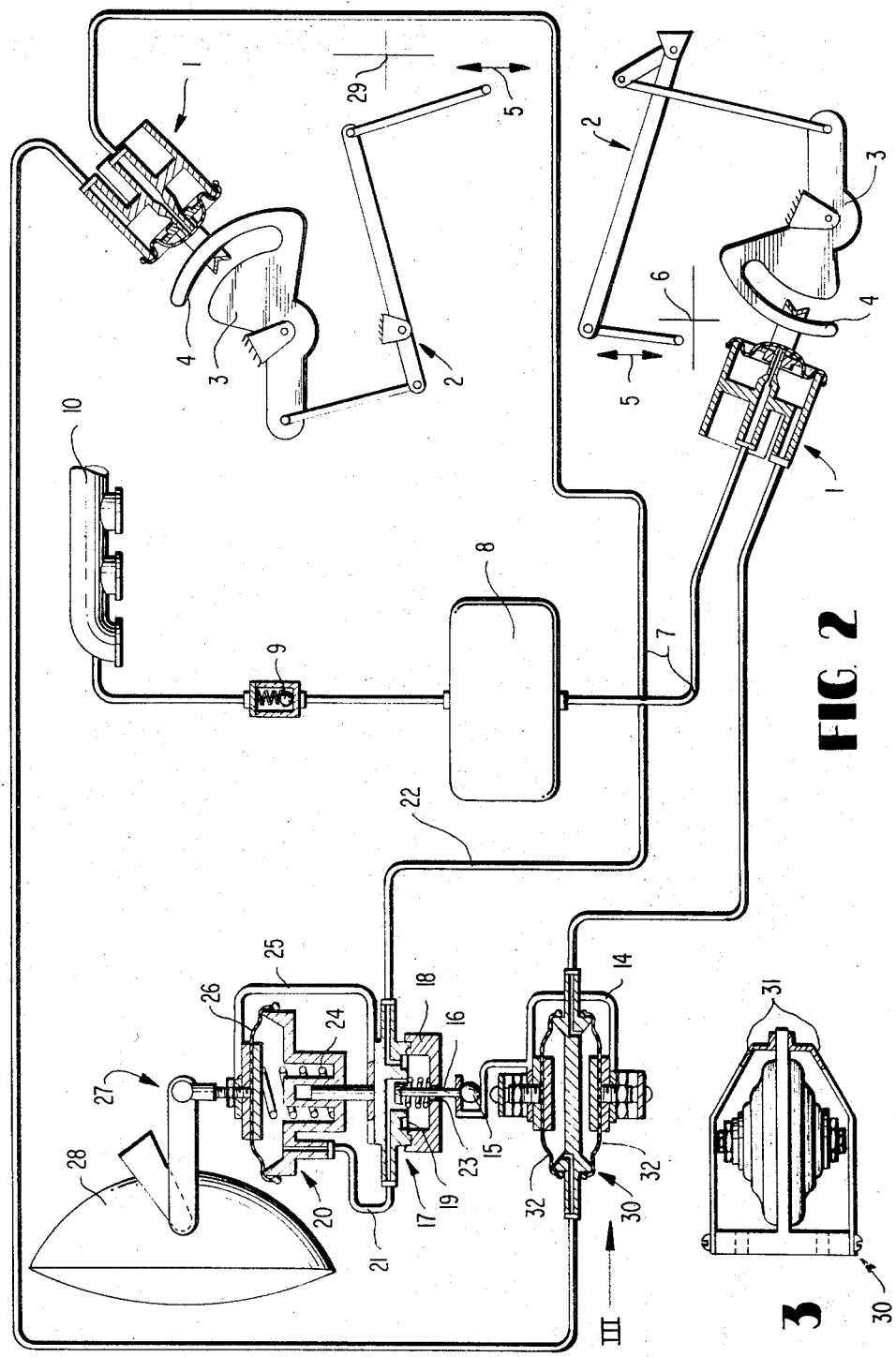

PNEUMATICALLY OPERATING CONTROL INSTALLATION FOR THE AUTOMATIC ALIGNMENT OF MOTOR VEHICLE HEADLIGHTS

The present invention relates to a pneumatically operating control installation for the automatic alignment of motor vehicle headlights, consisting of control members coordinated to one or both axles of the motor vehicle, which align the motor vehicle headlights to a constant light range in dependence on the change of the distance of the respective axle to the superstructure of the motor vehicle by way of adjusting motors and a control switching device.

Known, electrically operating control systems involve large expenditures and are therefore costly. Other, pneumatically operating systems in which each headlight is individually connected to a pressure system, permit only an inaccurate alignment due to unequal friction values in the adjusting members at the headlights. Furthermore, in the prior art pneumatic control installations, the sealing problem is not solved satisfactorily so that due to changes in the volume of the pressure gas, for example, as a result of small leaks, inaccuracies occur in the alignment of the headlights, or even the function of the installation is considerably impaired or rendered completely impossible.

The present invention is concerned with the task to provide a structurally simple control installation which operates reliably also in case of the occurrence of small leaks while eliminating the aforementioned shortcomings.

The underlying problems are solved according to the present invention with the aforementioned installation in that the control system is supplied with a continuously available vacuum and the control members are constructed as pressure modulators.

This installation is connected to a vacuum source, for example, to the suction pipe of the motor vehicle internal combustion engine, and thus represents an open system in which temperature fluctuations or volume changes by diffusion, for example, at a leakage place are automatically and continuously compensated for.

In a preferred embodiment of the present invention, with the use of one pressure modulator for each of the two axles, both pressure modulators may act on a common, double-acting adjusting motor. A further simplification of the system is achieved thereby.

A completely satisfactory control of the light range or light distance is achieved according to the present invention in that the changes of the distances of the front and/or rear axle to the superstructure of the motor vehicle are detected proportionally.

For commercial types of motor vehicles, such as trucks, it suffices to detect the axle movement relative to the superstructure at only one wheel axle whereas it is advantageous with passenger motor vehicles to detect the changes in distance at both wheel axles.

According to a further feature of the present invention, the control in dependence on the distance of only one axle, preferably of the rear axle, with respect to the superstructure of the motor vehicle may take place progressively.

Accordingly, it is an object of the present invention to provide a control system for the automatic alignment of motor vehicle headlights which avoids by simple means the aforementioned shortcomings and drawbacks encountered in the prior art.

Another object of the present invention resides in a pneumatically operating control installation for the automatic alignment of motor vehicle headlights, which is relatively simple in construction and therefore also relatively inexpensive.

A further object of the present invention resides in a control system for the automatic alignment of motor vehicle headlights which assures an accurate alignment of the headlights under all operating conditions.

A still further object of the present invention resides in a control system of the type described above which minimizes failures or breakdowns due to leaks in the system.

Another object of the present invention resides in an automatic control system for the alignment of the headlights of motor vehicles which maintains the light range of the headlights constant with satisfactory accuracy, yet minimizes the number of parts necessary therefor.

These and further objects, features and advantages of the present invention will become more apparent from the following description when taken in connection with the accompanying drawing which shows, for purposes of illustration only, two embodiments in accordance with the present invention, and wherein:

FIG. 2 is a schematic view, similar to FIG. 1, of a modified embodiment of a control installation in accordance with the present invention, controlled by two pressure modulators; and FIG. 3 is an elevational view taken in the direction of arrow III of an adjusting motor according to FIG. 2.

Figure 1:
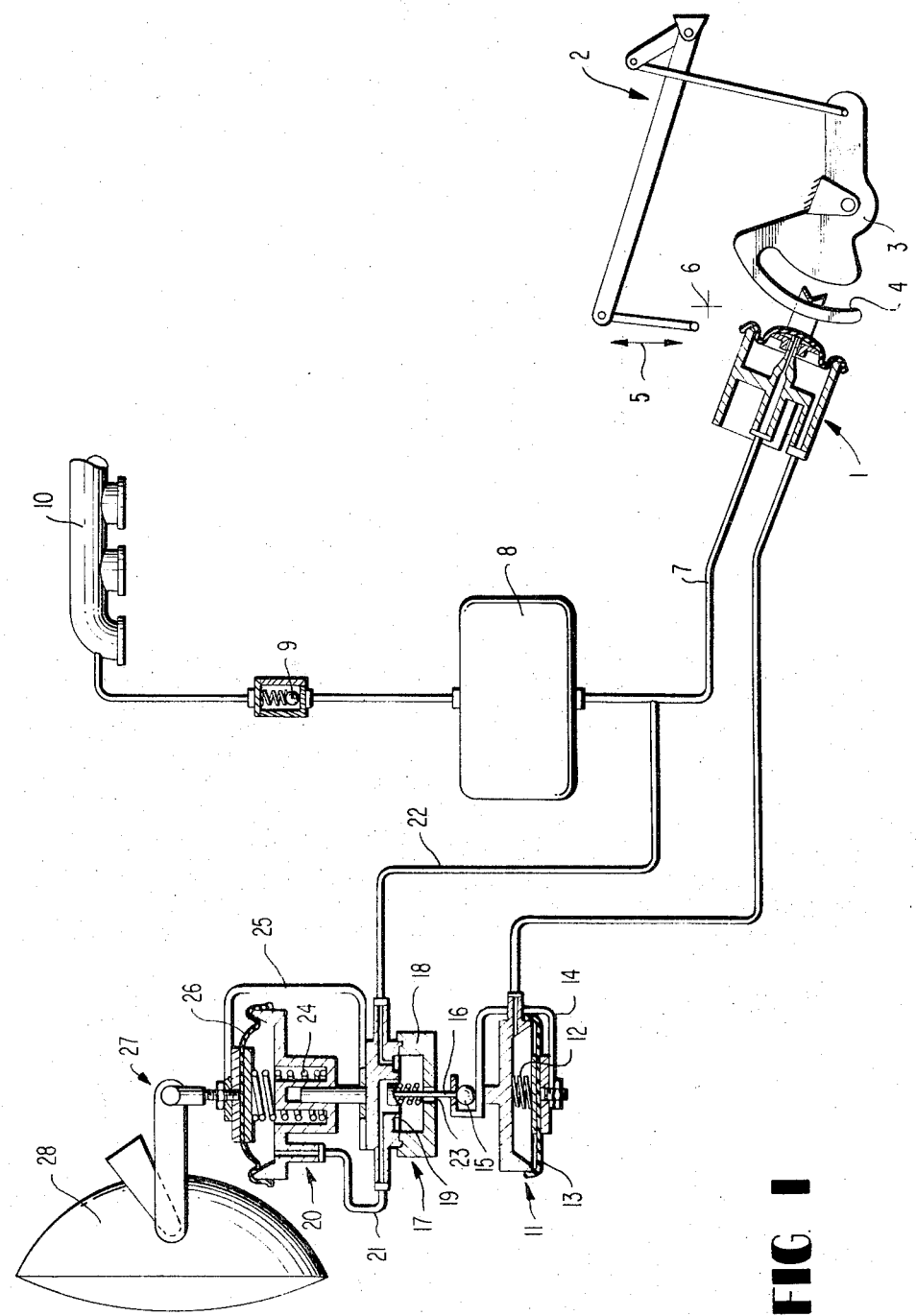
FIG. 1 is a schematic view, partially in cross section of a control installation according to the present invention which is controlled by a pressure modulator to be mounted preferably at the rear axle.

Referring now to the drawing wherein like reference numerals are used throughout the various views to designate like parts, and more particularly to FIG. 1, according to this figure, a pressure modulator generally designated by reference numeral 1 and secured at the superstructure, for example, at the body of a motor vehicle, which detects the vertical movements 5 of the rear axle 6 by way of a linkage generally designated by reference numeral 2 and by way of a control cam 4 arranged at a lever 3, is connected by way of a reservoir tank 8 and a check valve 9 with a suction pipe 10 of the motor vehicle internal combustion engine, from which the vacuum is derived. By means of the vacuum which is modulated by the pressure modulator 1 in dependence on the position of the superstructure with respect to the rear axle 6, an adjusting motor generally designated by reference numeral 11 is loaded acting opposite the force of a spring 12, whose diaphragm 13 is connected with a mushroom piston 16 of a control switching device generally designated by reference numeral 17 by means of an angularly bent rod 14 extending about the adjusting motor 11 and by way of a ball joint 15. The control switching device 17 is so constructed that the mushroom piston 16 displaceably arranged in a flat cylindrical housing 18, depending on the movement of the diaphragm 13, connects with the assistance of a diaphragm 19 a second adjusting motor generally designated by reference numeral 20 by way of a line 21 either with the vacuum by way of line 22 connected to the line 7 or with the atmosphere by way of an aperture 23 provided in the bottom of the housing 18 for the mushroom piston 16. The vacuum in the adjusting motor 20 acts against a spring 24. An angularly bent actuating rod 25 extending about the adjusting motor 20 is connected with a diaphragm 26 of the adjusting motor 20 and with the control device 17. An adjusting linkage generally designated by reference numeral 27 for the adjustment of the headlights 28 is secured at the diaphragm 26. After each deflection of the diaphragm 26, the housing 18 of the control device 17 is again brought back into the insulated starting position by the adjusting rod 25 and a renewed shifting operation can be initiated again at any time.

The control installation illustrated in FIG. 2 essentially corresponds to the control installation according to FIG. 1, with the difference that it is controlled by two pressure modulators 1 which are arranged at the rear axle 6 and at a front axle 29 of a motor vehicle. Two modulated vacuum pressures are available which act on a common double-acting adjusting motor generally designated by reference numeral 30 against the force of a spring 31 arranged outside of the adjusting motor and illustrated in FIG. 3. As a result thereof, the movements of the two axles of the motor vehicle are combined into a shifting magnitude. The adjusting motor 30 actuates the mushroom piston 16 of the control switching device 17 by way of the rod 14 which at the same time fixes the two diaphragms 32 of the adjusting motor 30 in a predetermined position relative to one another. The two modulated vacuum pressures can act also on one adjusting motor 11 each, which is then constructed corresponding to FIG. 1. In that case, not illustrated, the output values of the two adjusting motors 11 are then combined, for example, by a scale beam-like lever into a single shifting magnitude and then are further transmitted to a control switch 17 by way of the rod 14.

The supply tank 8 installed downstream of the check valve 9 assures always a completely satisfactory functioning of the control installation. Thus, also when driving at full gas when no vacuum exists in the suction pipe, vacuum is available from the tank 8. Similarly, the control installation remains also capable of functioning during a brief standstill of the engine. However, also after longer operating pauses, and even under the assumption that no vacuum is present any longer after some time due to leakages in a part of the control installation, the control installation is ready to operate almost immediately after the starting of the engine. In both embodiments, air with atmospheric pressure is then present after such a longer operating pause in the adjusting motors 11 or 30 and 20. The diaphragm 13 or diaphragms 32 and 26 are therefore completely extended, and the headlights 28 are in a downwardly directed end position.

This means that the mushroom piston 16 lifts the diaphragm 19 from its seat and thus a connection exists between the lines 21 and 22. During the starting, vacuum is thus available immediately in the adjusting motor 20 which effects an adjusting movement of the headlights 28 in the upward direction that lasts for such length of time until the inlet to the line 21 is closed by the abutment of the diaphragm 19 due to the opposite movement of the control member 17 and the mushroom piston 16. If, for example, by loading the vehicle rear section, the adjusting motor 11 or 30 is acted upon by vacuum by means of the pressure modulator 1 at the rear axle 6, the piston 16 lifts off from the diaphragm 19 whereby the path into the atmosphere opens for the vacuum present in the adjusting motor 20 by way of the line 21, through a gap between the diaphragm 19 and the stem of the mushroom piston 6 and through the passage 23, and thus the light axes of the headlights 28 are again lowered.

By an appropriate matching of all line cross sections, it is possible to so select the damping in the lines that the headlight adjustment is corrected also during braking or acceleration drives whereas the control installation does not respond in case of higher frequency of the axle deflections, for examle, when driving on a poor road.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A control installation for automatically aligning motor vehicle headlights on motor vehicles of the type having axles and a superstructure which is relatively movable with respect to at least one of said axles; said installation comprising:

first adjusting motor means actuable in response to supply of a pressure medium to said first adjusting motor means, first interconnecting means for interconnecting said first adjusting motor means to said headlights such that actuation of said first adjusting motor means effects changes in the inclination of said headlights with respect to the superstructure, first circuit means for substantia'ly continuously supplying a pressure medium during operation of said vehicle, control valve means movable between a first control valve position for communicating said first adjusting motor means with said pressure medium in said first circuit means to actuate said first adjusting motor means and a second control valve position for communicating said first adjusting motor means with other than said pressure medium, and control installation means for automatically and continuously controlling the movement of said control valve means in response to relative changes in position of at least one of said axles with respect to said superstructure during operation of said vehicle, including during at least a portion of the operation of said vehicle with said vehicle in motion.

2. An installation according to claim 1, wherein said control installation includes: second adjusting motor means actuable in response to supply of a pressure medium to said second adjusting motor means, second interconnecting means for interconnecting said second adjusting motor means to said control valve means to move said control valve means, second circuit means for communicating a pressure medium to said second adjusting motor means, and pressure modulator means for modulating the pressure of the pressure medium in said second circuit means in direct response to the relative changes in position of at least one of said axles with respect to said superstructure.

3. An installation according to claim 1, wherein said first circuit means is communicated directly with a suction pipe of an engine of said vehicle, whereby said pressure medium in said first circuit means is at subatmospheric pressure corresponding to suction pipe pressure.

4. An installation according to claim 2, wherein said first circuit means is communicated directly with a suction pipe of an engine of said vehicle, whereby said pressure medium in said first circuit means is at subatmospheric pressure corresponding to suction pipe pressure.

5. An installation according to claim 4, wherein one side of said pressure modulator means is communicated directly with said suction pipe and the other side is communicated with said second circuit means.

6. An installation according to claim 2, wherein one side of said pressure modulator means is communicated directly with a suction pipe of an engine of said vehicle and the other side is communicated with said second circuit means.

7. An installation according to claim 4, wherein said first circuit means is connected closer to said suction pipe than said pressure modulator.

8. An installation according to claim 5, wherein said control valve means includes means for communicating atmospheric air to said first adjusting motor when said control valve means is in said second position.

9. An installation according to claim 5, wherein said second adjusting motor means maintains said control valve means in said second control valve position in the absence of intake vacuum in said first and second circuit means, whereby said first circuit means is communicated directly with said first adjusting motor means on initial start-up of the engine after an extended engine shutdown.

10. An installation according to claim 2, wherein said second adjusting motor means is constructed with two diaphragm chambers communicating by said second circuit means with respective ones of two pressure modulator means arranged respectively in conjunction with two vehicle axles, the diaphragm members of said chambers being connected to said control valve means.

11. An installation according to claim 5, wherein said second adjusting motor means is constructed with two diaphragm chambers communicating by said second circuit means with respective ones of two pressure modulator means arranged respectively in conjunction with two vehicle axles, the diaphragm members of said chambers being connected to said control valve means.

12. An installation according to claim 3, wherein a reservoir tank means and a check valve means are arranged between said suction pipe and said first circuit means, whereby said subatmospheric pressure is maintained after engine shutdown.

13. An installation according to claim 7, wherein a reservoir tank means and a check valve means are arranged between said suction pipe and said first circuit means, whereby said subatmospheric pressure is maintained after engine shutdown.

14. An installation according to claim 1, wherein said control installation means includes means responsive to relative changes in position of two separate axles with respect to said superstructure.

15. An installation according to claim 1, wherein said control installation means includes means for proportionally detecting changes in distances of said at least one of said axle with respect to said superstructure.

16. An installation according to claim 1, wherein said control installation means includes means responsive to relative changes in position of only one axle with respect to said superstructure.

17. An installation according to claim 16, wherein said one axle is a rear axle of said vehicle.

18. An installation according to claim 16, wherein said control installation means include means which are progressively responsive to relative changes in position of said one axle with respect to said superstructure.

19. An installation according to claim 2, wherein each of said first and second adjusting motor means are vacuum-operated spring loaded motors.

20. An installation according to claim 19, wherein said second interconnecting means include a rod connected with a movable diaphragm of said second adjusting motor means and with a movable closure member of said control valve means.

* * * * *